Oct. 31, 1939. A. MOUTON ET AL 2,178,049
ELECTRICAL HEATING APPARATUS OF THE STORAGE TYPE
Filed March 24, 1937 2 Sheets-Sheet 2
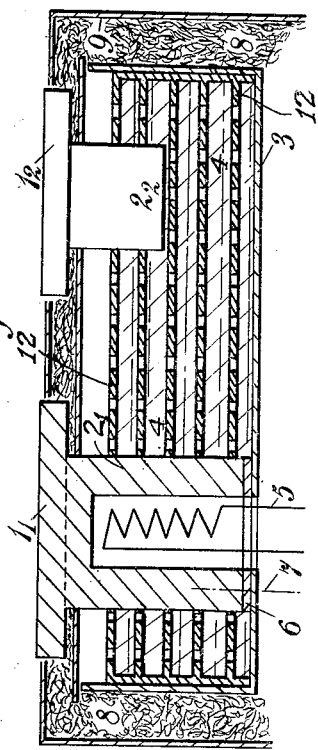
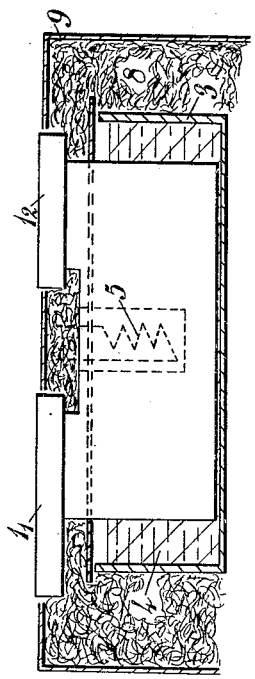
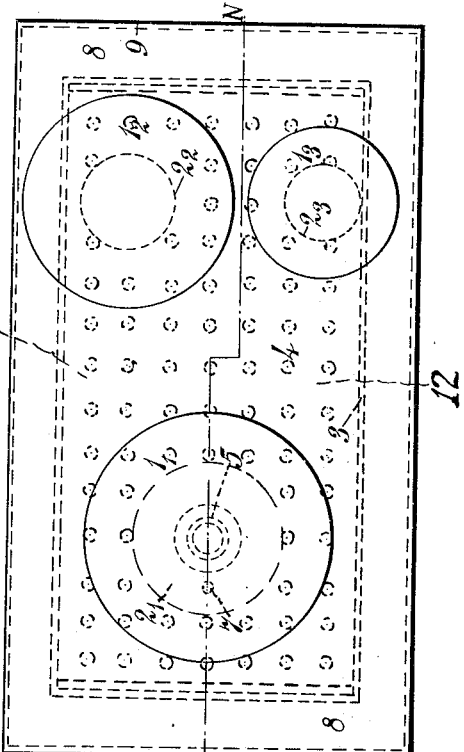
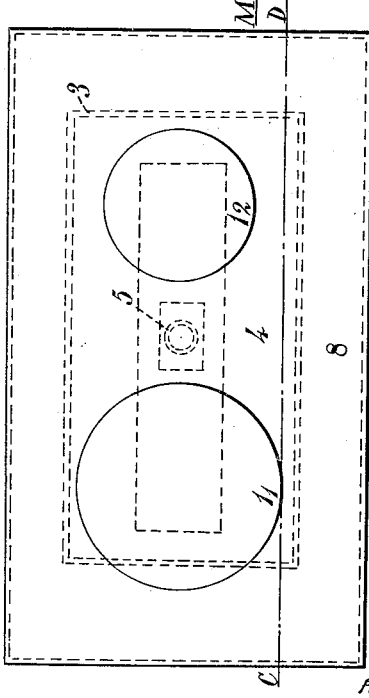

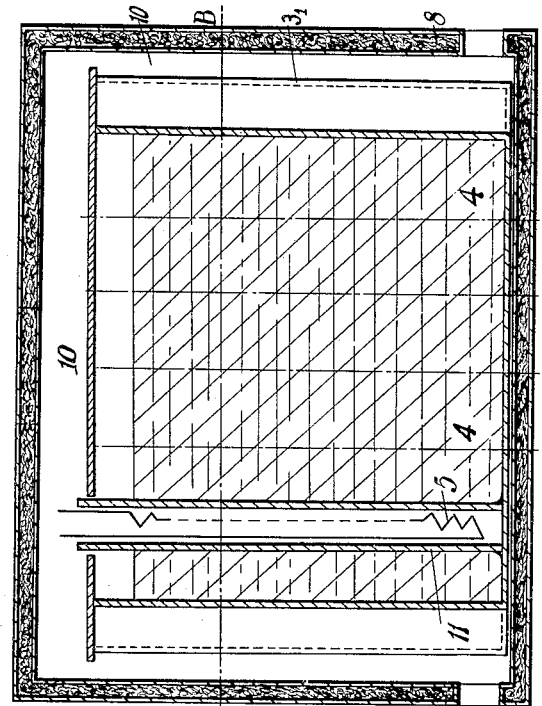
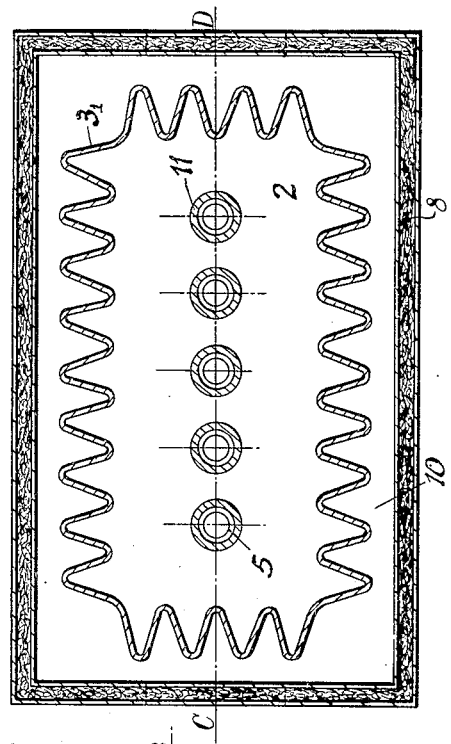
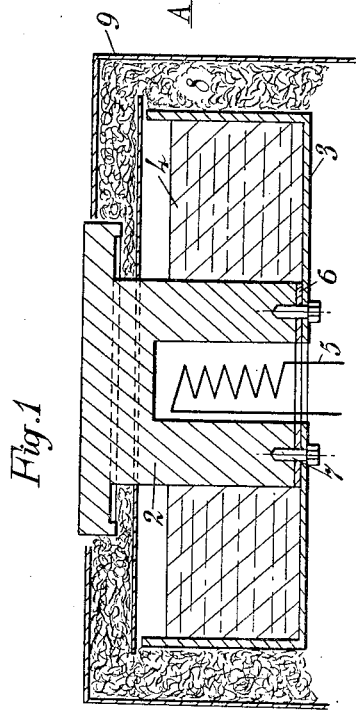
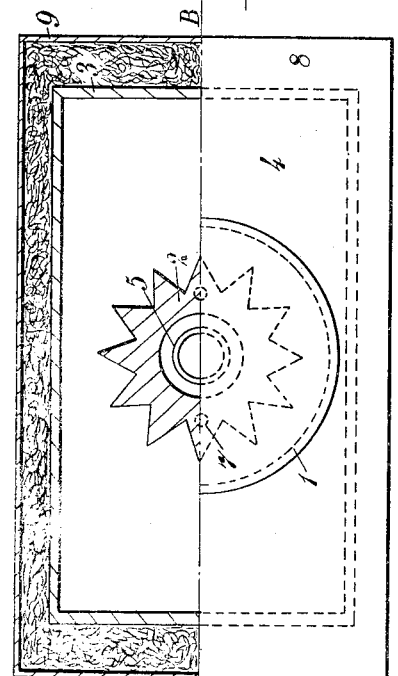

Patented Oct. 31, 1939

2,178,049

UNITED STATES PATENT OFFICE 2,178,049

ELECTRICAL HEATING APPARATUS OF THE STORAGE TYPE

Augustin Mouton, Trazegnies, and Albert Huet, Jamioulx, Belgium

Application March 24, 1937, Serial No. 132,856
In Belgium April 8, 1936

2 Claims. (Cl. 219—37)

The present invention relates to electrical heating apparatus of the storage type and comprises arrangements for increasing the storage capacity of such apparatus while permitting the heat stored to be used at a temperature best suited for the purpose envisaged.

Electrical cookers of the storage type are already known wherein the heat is stored in a salt such as sodium or potassium nitrate.

Such apparatus, however, have hitherto had the disadvantages among others of decomposition of the nitrate due to contact with a very hot surface and the production of dangerous stresses on the walls of the container in which the salt is placed upon the successive fusion and solidification of said salt.

The object of the present invention is to overcome these disadvantages. For this purpose according to one feature of the invention, the heating element is immersed directly in the mass of salt but is not completely covered by said mass.

According to a further feature of the invention the heating element has a large contact surface with the salt so as to prevent its decomposition by contact with a surface at a high temperature.

The salt bath intended to be used as a storer of heat may be heated either by a heating element immersed in the bath, or by a resistance placed outside the box containing the salt such as alkali nitrate, or further by means of a resistance placed inside the metal block immersed in the salt and integral with the hot plate; this block is also used for transmitting the heat of the bath towards the hot plate.

According to the invention, if it is desired to avoid the decomposition of the alkali nitrate at high temperature, it is desirable to give to the heating body a large surface of contact with the bath. For example, a tube of small diameter containing a resistance and which would be normally heated to red heat or nearly red heat by the passage of current would cause a decomposition of the nitrate at the surface of contact with the salt bath. Heating elements of this kind must therefore be rejected as far as possible.

In order that it may be understood how the characteristic arrangements above-mentioned may be practically embodied, certain preferred forms of embodiment will be described hereinunder in more detail, given, it will be understood only by way of example and represented diagrammatically in the accompanying drawings in which:

Figure 1 shows in vertical section the upper part of a cooker with a hot plate embodied according to the invention;

Figure 2 shows a horizontal section and a half view in plan of the said cooker;

Figure 3 is a vertical section of a cooker with two hot plates;

Figure 4 is a plan view of the said cooker with two hot plates;

Figure 5 shows in vertical section a cooker with three plates one of which is heated directly;

Figure 6 is a plan view of the said cooker;

Figure 7 shows a vertical section of a heat accumulator according to the invention for use in a heating stove;

Figure 8 is a horizontal section of said accumulator.

In Figures 1, 2, 3, 4, 5 and 6:

1, $1_1$, $1_2$, $1_3$ denote the hot plates;

2, $2_1$, $2_2$, $2_3$ denote the blocks integral with the plates and immersed in the bath of salt;

3 is the box containing the salt;

4 is the salt;

5 is the heating resistance;

6 is an asbestos packing;

7 is a screw for securing the block on the bottom of the box;

8 is the heat insulation;

9 is the outer plate of the cooker.

In the drawings the heating resistance 5, electrically insulated, has been preferably placed in the metal block, for example, a cast iron block integral with the plate. It has the advantage of permitting a more rapid heating of the plate connected to the block containing the resistance when the cooker has been out of service for a fairly long time. It is also easy to arrange this block to be immersed in the salt so that the transmission of heat from the block to the salt will be easily effected with a very small difference in temperature between the block and the bath of salt; in this way there is in particular avoided during the period of load a high temperature of the heating block which would lead to decomposition of the salt.

During the period of discharge a very large drop in temperature between the bath and the plate is also prevented in this way.

Figure 2 shows by way of example an embodiment of the block, the horizontal section of which is in star form in order to increase the surface of contact between the block and the bath of salt.

During the discharge period of the cooker, when the salt bath supplies heat to the hotplate, the salt solidifies in the first place in contact with the metal block which is connected with the hot-plate of the cooker. The said block thus becomes covered with a layer of solid salt which is a very bad heat conductor. The presence of this layer prevents the heat from passing from the still liquid part of the bath to the hot-plate and this disadvantage is the more serious the greater the dimensions of the salt bath. In the latter case, and in accordance with the invention, a series of metal sheets or a metal wire network is placed in the salt bath, the metal plates or the metal network being maintained in intimate contact with the block. The metal sheets are preferably perforated so as to allow the formation of convection currents in the liquid salt.

In Figures 1 and 2 the heating of the block is effected by a resistance introduced into a cavity provided in the lower part of this block. In this case the block rests as far as possible on the bottom of the box and is secured to it by screws 7; a packing joint 6 of asbestos for example prevents the liquid from flowing towards the outside.

Generally according to the invention the heating elements if they are placed in the box containing the bath of salt arranged in such a way that the upper part of the heating element is not covered by the salt bath so that in fusing around the heating element a part of the liquid salt can flow freely to the surface of the bath, in order to avoid forces due to the expansion of the salt when melting. For the same reason, the heating blocks rest as far as possible on the bottom of the box containing the salt in such a way as to prevent the part of salt comprised between the block and the bottom of the box from being able, while fusing and expanding to exert harmful forces on the bottom of the box while the upper part of the bath is still solid.

In order to prevent considerable losses of heat, the box assembly is carefully insulated by a thermal insulating substance 8.

On the side of the cooker which in the most common type of cooker is placed under the salt bath, a certain loss of heat may be allowed so as to maintain the cooker constantly at a temperature in the neighbourhood of 60° C. to 70° C.

This will have the advantage of permitting a reduction in the size of the heating resistance of the cooker and of using the cooker for keeping dishes warm without having to put the heating resistance into service.

In the cooker represented diagrammatically in Figures 3 and 4, two plates are heated directly by a resistance placed in the single iron block connecting the two plates. This resistance is introduced from the top thereby avoiding the necessity of piercing the bottom of the box 3 having straight walls as shown. The iron block rests directly on the bottom of the box for the reason given above.

The cooker shown (Figures 5 and 6) comprises a hot plate $l_1$ and other unheated plates $l_2$ and $l_3$. These plates which will be at a temperature slightly lower than that of the plate $l_1$ are used preferably for cooking preparations requiring a relatively low temperature. It is also possible in order to be able to arrange for a certain scale of temperature, to decrease the temperature of one of these plates or of both by reducing the surface of the block immersed in the salt bath; it is to be noted that the blocks of these unheated plates may without disadvantage be shorter than the heating block. The cooker of Figure 5 comprises a block $2_2$ shorter than the others. 12 indicates a series of perforated metal sheets for increasing the heat conductivity of the salt bath.

Figure 7 shows in vertical section and Figure 8 in horizontal section a modified embodiment of a heat storage apparatus according to the invention for use in a heating stove.

The salt is contained in a box 2 having walls 3, which are shown in Fig. 8 as undulated in order to increase the surface of contact with the air, and for the same purpose these walls may also be provided with cooling fins.

The air becomes hot while rising in the space 10 comprised between the box containing the salt and the outer wall of the stove which will preferably be a double heat insulated wall.

The heating elements in the example shown and according to the invention are constituted by insulated resistances 5 placed in tubes 11 welded to the bottom of the box, but able to slide freely in the upper cover in such a way as to permit the free expansion of the tubes when being heated.

In order to prevent too high a temperature of the heating elements in contact with the salt use is made of a sufficiently large number of tubes or further the surface of these is increased by increasing their diameter or by providing them externally with fins. Their diameter may for example be greater than that which would be strictly necessary, a space comprised between the resistance and the tube being then filled with refractory material.

In order to facilitate the transmission of heat between the heating elements and the salt bath there may be arranged inside the latter and in contact with the heating elements, a trellis network of metal wires or of perforated plates.

The maximum temperature of the salt bath for the cooker and for the heating stove is generally limited by an automatic device for example a thermostat, which cuts off the current as soon as this temperature is reached.

It is to be clearly understood that the invention is not limited to the examples described above.

Without departing from the scope of the invention the heating element of the cooker may be outside the box containing the salt or further inside the box but outside a block connected to a hot plate.

Besides sodium or potassium nitrate being the material for the storage of heat a mixture of these two salts or with other salts may be used.

We claim:

1. In an electrical apparatus for heat storage such as storage stoves and cookers, the combination with a receptacle provided with a hot plate assembly and a mass of heat-storage material disposed in said receptacle, of heating means constituted by a metal block having an electrical heating element incorporated within it, said metal block beng integral with at least one hot plate of said assembly and being immersed directly in the mass of heat-storage material, but not completely covered by said mass, and perforated metal plates suitably supported in contact with said metal block and distributed throughout the whole mass of heat-storage material in a manner to increase the thermal conductivity of the latter.

2. In an electrical apparatus for heat storage such as storage stoves and cookers, the combination with a receptacle provided with a hot plate assembly and a mass of heat-storage material disposed in said receptacle, of heating means constituted by a metal block having an electrical heating element incorporated within it, said metal block being integral with at least one hot plate of said assembly and being immersed directly in the mass of heat-storage material, but not completely covered by said mass, another metal block integral with another hot plate of said assembly, and perforated metal plates suitably supported between said metal blocks and distributed throughout the whole mass of heat-storage material in a manner to increase the thermal conductivity of the latter.

AUGUSTIN MOUTON.
ALBERT HUET.